United States Patent
Berqvist et al.

(10) Patent No.: US 11,462,340 B2
(45) Date of Patent: Oct. 4, 2022

(54) CABLE INSULATION

(71) Applicant: BOREALIS AG, Vienna (AT)

(72) Inventors: Mattias Berqvist, Gothenburg (SE); Bernt-Åke Sultan, Stenungsund (SE)

(73) Assignee: BOREALIS AG, Vienna (AT)

(*) Notice: Subject to any disclaimer, the term of this patent is extended or adjusted under 35 U.S.C. 154(b) by 0 days.

(21) Appl. No.: 16/611,902

(22) PCT Filed: May 8, 2018

(86) PCT No.: PCT/EP2018/061874
§ 371 (c)(1),
(2) Date: Nov. 8, 2019

(87) PCT Pub. No.: WO2018/206580
PCT Pub. Date: Nov. 15, 2018

(65) Prior Publication Data
US 2020/0211731 A1 Jul. 2, 2020

(30) Foreign Application Priority Data
May 9, 2017 (EP) .................................... 17170147

(51) Int. Cl.
*H01B 3/44* (2006.01)
*C08K 3/22* (2006.01)
*C08K 5/14* (2006.01)
*C08K 5/3435* (2006.01)
*H01B 7/02* (2006.01)
*H01B 7/295* (2006.01)
*H01B 13/14* (2006.01)

(52) U.S. Cl.
CPC .............. *H01B 3/441* (2013.01); *C08K 3/22* (2013.01); *C08K 5/14* (2013.01); *C08K 5/3435* (2013.01); *H01B 3/447* (2013.01); *H01B 7/02* (2013.01); *H01B 7/295* (2013.01); *H01B 13/148* (2013.01); *C08K 2003/2227* (2013.01)

(58) Field of Classification Search
CPC ...... H01B 3/441; H01B 3/447; H01B 3/4484; H01B 7/02; H01B 7/295; H01B 13/148; C08K 3/22; C08K 5/3435

USPC ............. 264/236; 174/110 SR; 252/500, 511
See application file for complete search history.

(56) References Cited

U.S. PATENT DOCUMENTS

| 6,392,154 B1 | 5/2002 | Lee et al. | |
| 6,858,296 B1* | 2/2005 | Mendelsohn | H01B 1/24 174/110 PM |
| 2002/0169238 A1* | 11/2002 | Caronia | C08K 5/372 524/100 |
| 2004/0002559 A1* | 1/2004 | Troutman | C09D 5/185 524/100 |
| 2006/0116456 A1* | 6/2006 | Lin | C08K 5/005 524/192 |
| 2009/0043012 A1* | 2/2009 | Easter | C08L 23/06 523/173 |
| 2012/0125657 A1* | 5/2012 | Brown | C08K 5/521 174/110 SR |
| 2017/0051208 A1* | 2/2017 | Iwata | H01B 3/44 |
| 2017/0306133 A1* | 10/2017 | Hayashi | C08K 5/11 |

FOREIGN PATENT DOCUMENTS

| EP | 2527396 A2 | 11/2012 | |
| WO | 9921194 A1 | 4/1999 | |
| WO | 02070600 A2 | 9/2002 | |
| WO | 2006060093 A1 | 6/2006 | |
| WO | WO-2015178151 A1 * | 11/2015 | ............. C08L 23/02 |

OTHER PUBLICATIONS

International Search Report and Written Opinion issued in Application No. PCT/EP2018/061874 dated Aug. 27, 2018, 9 pages.
Schettini, Evelia & Vox, Giuliano & L, Stefani. (2014). Interaction between agrochemical contaminants and UV stabilizers for greenhouse EVA plastic films. Applied engineering in agriculture. 30. 229-239. 10.13031/aea.30.10048.

* cited by examiner

*Primary Examiner* — Tri V Nguyen
(74) *Attorney, Agent, or Firm* — Ditthavong, Steiner & Mlotkowski

(57) ABSTRACT

The present invention relates to a wire or cable comprising a conductor coated with an insulation composition, wherein said insulation composition comprises: i) a polyethylene copolymer having a melting point of 105° C. or less; and ii) a hindered amine light stabiliser (HALS) comprising at least one 2,2,6,6-tetramethyl-piperidinyl group present in an amount of 0.5 to 1.5 wt %.

14 Claims, 1 Drawing Sheet

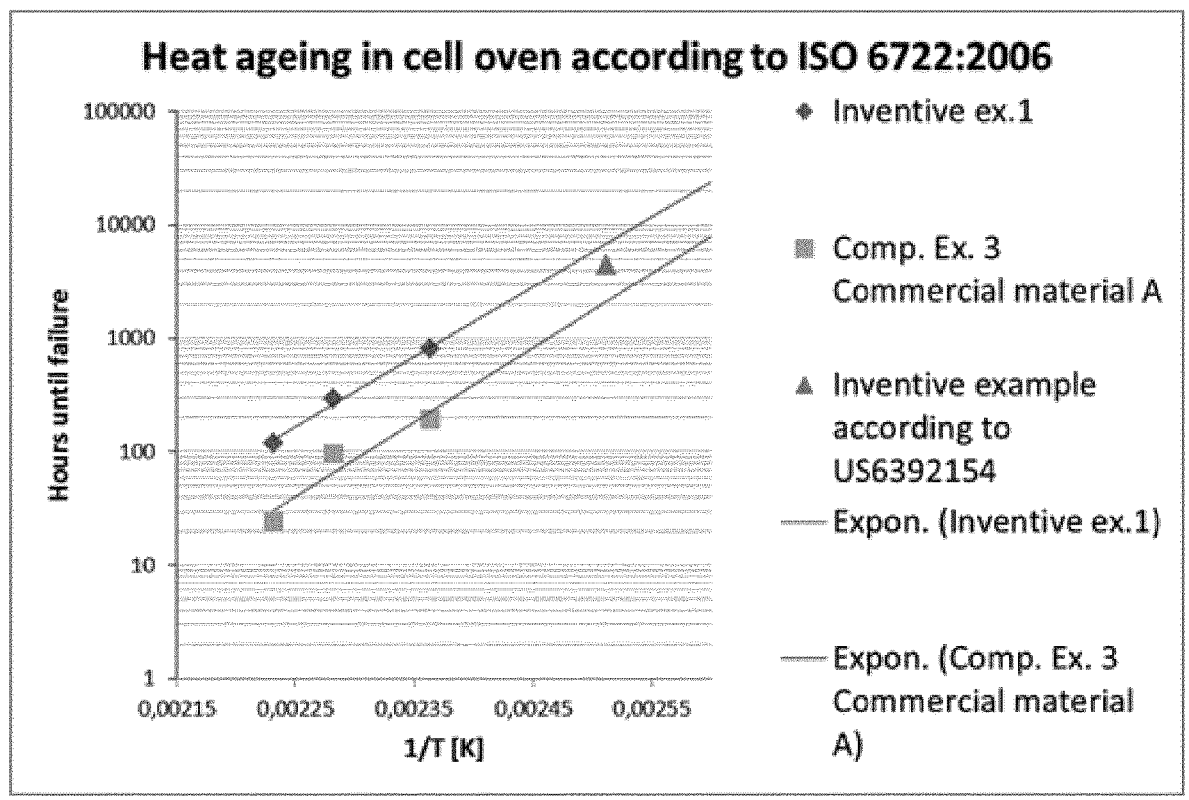

CABLE INSULATION

CROSS REFERENCE TO RELATED APPLICATIONS:

This application is a 35 U.S.C. § 371 National Stage of International Application No. PCT/EP2018/061874, filed May 8, 2018, which claims priority from European Application No. 17170147.7, filed on May 9, 2017, the entire contents and disclosures of each are hereby incorporated by reference.

This invention relates to a new composition for the insulation layer on a wire or cable. In particular, the invention relates to the combination of certain low melting point polyethylene copolymers with a hindered amine light stabiliser in the insulation layer of a wire or cable. The invention further relates to a composition of matter suitable for use in the insulation layer of a wire or cable comprising certain low melting point polyethylene copolymers with a hindered amine light stabiliser.

BACKGROUND

Many different compositions are used as polymeric insulators for electrical conductors. These compositions typically contain a polyethylene such as an ethylene vinyl acetate copolymer. However, polyethylenes alone are ineffective insulators due to oxidative degradation of the polymeric material at the high temperatures usually found in electrical devices.

Because of the instability of the polymers, various additives are typically mixed with the polymeric material to improve the heat ageing of the material. There are many disclosures in the prior art regarding possible additive packages that can aid heat stabilisation. For example, it is common for hindered phenol antioxidants to be added to the insulation layer. Other additives that are typically added to the insulating materials include zinc salt of a mercaptobenzimidazole, e.g. U.S. Pat. Nos. 4,824,883, 4,797,323, 4,693,937 and 4,260,661.

In U.S. Pat. No. 6,392,154, the inventors propose an insulating composition consisting essentially of a copolymer of ethylene and vinyl acetate, a zinc salt of a mercaptobenzimidazole, aluminium trihydrate, and a peroxide curing agent consisting of para and meta isomers of [alpha],[alpha]'-bis(t-butylperoxy) diisopropyl benzene. This insulating composition has thermal stability and fast cure.

U.S. Pat. No. 6,326,422 describes a composition comprising certain polyethylene copolymers, a hydrated inorganic filler, an alkoxysilane and a zinc salt of a mercaptobenzimidazole which can be cured by irradiation.

In WO99/57190, the inventors propose a synergistic combination of zinc salt of a mercaptobenzimidazole, zinc dibutyldithiocarbamate and tetrakis(methylene(3,5-ditert-butyl-4-hydroxyhydrocinnamate.

Wires, such as those used in road vehicles, need to satisfy certain requirements in order to be fit for purpose. In particular, wires must resist ageing caused by heat. Heat ageing is regulated by ISO standard 6722.

The wall thickness of the insulation layer material present on the conductor during the testing procedure was previously defined as 0.3 mm. The current standard requires that insulation materials must pass the test with an insulation layer thickness of 0.25 mm for thin wall wires. It will be clear that the thinner insulation layer thickness makes passing the test procedure significantly more challenging.

The person skilled in the art is therefore looking for new materials that can meet the new exacting standard, in particular passing a heat ageing at 125° C. of 3000 hours or 240 hr at 150° C.

The inventors have now realised that the inclusion of a hindered amine light stabiliser (HALS) such as Sabostab UV 94 provides superior thermo-oxidative stability for thin wall cables, in particular compared to market leading additives such as Vanox ZMTI. VANOX ZMTI is an antioxidant that is often used to provide protection against heat and oxygen ageing, especially combined with phenolic type antioxidants. Structurally, it is 2-mercapto-toluimidazole zinc.

Our results demonstrate that the HALS motif provides improved thermal ageing properties, in particular when combined with antioxidants. The HALS additive is well known at preventing light-induced degradation of most polymers. These additives are often found therefore in polymer films or other articles in which light stability is crucial.

There is no teaching, however, that these additives can prevent heat ageing in wire and cable applications, e.g. at temperatures of 125° C. or more, e.g. 135° C. or more.

SUMMARY OF INVENTION

Viewed from one aspect the invention provides wire or cable comprising a conductor coated with an insulation composition, wherein said insulation composition comprises:

i) a polyethylene copolymer having a melting point of 105° C. or less; and ii) a hindered amine light stabiliser (HALS) comprising at least one 2,2,6,6-tetramethyl-piperidinyl group, wherein HALS is present in an amount of 0.5 to 1.5 wt %.

Viewed from another aspect the invention provides wire or cable comprising a conductor coated with an insulation composition, wherein said insulation composition comprises:

i) an ethylene (meth)acrylate copolymer, an ethylene plastomer or an ethylene vinyl carboxylate copolymer, especially an ethylene vinyl acetate copolymer; and ii) a hindered amine light stabiliser (HALS) comprising at least one 2,2,6,6-tetramethyl-piperidinyl group, wherein said HALS is present in an amount of 0.5 to 1.5 wt %.

Viewed from another aspect the invention provides a composition suitable for use as an insulation coating for a wire or cable comprising:

i) 30 to 65 wt % of a polyethylene copolymer having a melting point of 105° C. or less, such as an ethylene vinyl acetate copolymer;

ii) a hindered amine light stabiliser (HALS) comprising at least one 2,2,6,6-tetramethyl-piperidinyl group present in an amount of 0.5 to 1.5 wt %; and iii) 30 to 69 wt % of a halogen free flame retardant such as a hydrated inorganic filler.

Viewed from another aspect the invention provides a composition suitable for use as an insulation coating for a wire or cable comprising:

i) 30 to 65 wt % of an ethylene (meth)acrylate copolymer, an ethylene plastomer or an ethylene vinyl carboxylate copolymer, especially an ethylene vinyl acetate copolymer; and ii) a hindered amine light stabiliser (HALS) comprising at least one 2,2,6,6-tetramethyl-piperidinyl group present in an amount of 0.5 to 1.5 wt %; and iii) 30 to 69 wt % of a halogen free flame retardant such as a hydrated inorganic filler.

Viewed from another aspect the invention provides the use of a composition as herein defined as the insulation layer of a wire or cable.

Viewed from another aspect the invention provides the use of a hindered amine light stabiliser (HALS) comprising at least one 2,2,6,6-tetramethyl-piperidinyl group to reduce heat ageing in a wire or cable comprising a conductor coated with an insulation composition, wherein said insulation composition comprises:

i) a polyethylene copolymer having a melting point of 105° C. or less; and ii) a hindered amine light stabiliser (HALS) comprising at least one 2,2,6,6-tetramethyl-piperidinyl group present in an amount of 0.5 to 1.5 wt %.

Viewed from another aspect the invention provides process for the preparation of a wire or cable as defined herein comprising extruding an insulation composition as defined herein onto a conductor to form a crosslinkable wire or cable comprising a conductor coated with said insulation composition; and crosslinking the crosslinkable wire or cable, e.g. by heating in a vulcanisation tube.

BRIEF DESCRIPTION OF THE DRAWING

FIG. 1 compares heat aging performance for the examples disclosed herein, the comparative examples, and an example taken from U.S. Pat. No. 6,392,154.

DETAILED DESCRIPTION OF INVENTION

This invention relates to the use of HALS compounds to improve the heat ageing capabilities of the insulation layer of a wire or cable comprising a low melting point polyethylene copolymer. We have remarkably found that these HALS compounds are able to significantly improve the heat ageing performance of the material at high temperatures.

The invention relates either to a wire or cable comprising an insulation composition as defined herein or to a composition of matter suitable for use in such an insulation layer. Embodiments described below are generally applicable to either the cable insulation or composition of matter aspects of the invention.

Polyethylene Copolymer

The polyethylene copolymer should have a melting point of 105° C. or less, such as 100° C. or less. In a most preferred embodiment, the melting point is 95° C. or less. The polyethylene copolymer typically has a melting point of at least 60° C. Such lower melting copolymers have a reduced crystallinity which is advantageous for e.g. flame retardant applications as they are able to be filled with inorganic fillers to a large extent without damaging its physical performance.

In any polyethylene copolymer, the ethylene monomer residues will form the predominant monomer residue units present (in wt % terms). More preferably, the polyethylene copolymer is an ethylene (meth)acrylate copolymer, an ethylene plastomer or an ethylene vinyl carboxylate copolymer, especially an ethylene vinyl acetate copolymer.

Ethylene Vinyl Carboxylate

The insulation layer composition of the invention preferably comprises an ethylene vinyl carboxylate, especially ethylene vinyl acetate. Suitable carboxylates include vinyl acetate, vinyl propionate, vinyl butyrate, vinyl pentanoate or vinyl hexanoate. It is most preferred if the polyethylene is ethylene vinyl acetate. The amount of vinyl acetate (relative to the amount of ethylene) in the resin can vary over wide limits. Typical values range from 5 to 40 wt % of the acetate, such as 15 to 35 wt % of the acetate in the polymer.

The density of the ethylene vinyl carboxylate resin may be in the range of 920 to 960 kg/m$^3$. Its MFR$_2$ may range from 0.1 to 40 g/10 min.

These polymers are commercially available materials.

Ethylene Alkyl (Meth)Acrylate Resin (EAA)

The insulation layer composition of the invention may comprise at least one ethylene alkyl (meth)acrylate resin. The term (meth)acrylate is intended to cover both methacrylates and acrylates, i.e. compounds of formula CH$_2$(Me)=CHCOO— or CH$_2$=CHCOO—. The (meth) designates therefore the optional presence of the methyl group forming the methacrylate. It is preferred, however, if the EAA of the invention is an acrylate.

The term "alkyl" is used to designate a C$_{1-6}$ alkyl, preferably a C$_{1-4}$ alkyl. Preferably the EAA may be an ethylene methyl (meth)acrylate, ethylene ethyl (meth)acrylate or ethylene butyl (meth)acrylate resin, especially ethylene methyl acrylate, ethylene ethyl acrylate or ethylene butyl acrylate resin (EMA, EEA and EBA respectively). Whilst mixtures of these resins can be used, it is preferred if only one EAA is used. Most preferably this is EMA.

The amount of (meth)acrylate (relative to the amount of ethylene) in the EAA resin can vary over wide limits. Typical values range from 5 to 40 wt % of the acrylate, such as 15 to 35 wt % of the acrylate in the EAA polymer.

The density of the ethylene alkyl (meth)acrylate resin may be in the range of 920 to 960 kg/m$^3$, preferably 930 to 955 kg/m$^3$. Its MFR$_2$ may range from 0.1 to 20 g/10 min.

These EAA polymers are commercially available materials and can be purchased from various suppliers, e.g. under the trade name Elvaloy™, Lotryl™, Amplify™, Lotader™ Lucotin™ etc.

Ethylene Plastomer

The insulation layer composition may also comprise an ethylene plastomer, e.g. an ethylene copolymer with one or more C3-10 alpha olefins. The density of the plastomer is preferably 900 kg/m$^3$ or less, such as 890 kg/m$^3$ or less. Plastomers preferably have a density of 860 kg/m$^3$ or more, such as 870 kg/m$^3$ or more.

The content of comonomer in the plastomer may range from 3 to 30 mol %, preferably 5 to 30 mol %.

Preferred plastomers are ethylene 1-hexene or ethylene 1-octene copolymers.

The insulation layer composition preferably comprises from 30 to 65 wt % polyethylene copolymer based on the weight of the insulation composition, preferably from 35 to 55 wt %, more preferably from 40 to 50 wt %.

The insulation layer composition preferably comprises from 30 to 65 wt % ethylene vinyl carboxylate or ethylene (meth)acrylate copolymer based on the weight of the insulation composition, preferably from 35 to 55 wt %, more preferably from 40 to 50 wt %.

The insulation layer composition preferably comprises from 30 to 65 wt % ethylene vinyl acetate copolymer based on the weight of the insulation composition, preferably from 35 to 55 wt %, more preferably from 40 to 50 wt %.

It is within the scope of the invention to employ a mixture of the polyethylene copolymers above. If a mixture is used, the combined total of the components preferably still meets the wt % presented above.

It is possible to combine the polyethylene copolymer with minor amounts, e.g. 0.5 to 20 wt %, such as 1.0 to 10 wt % of other well-known polymers, in particular other well-known polyolefins such as polypropylene homopolymers or copolymers or more preferably, known polyethylenes such as LDPE, HDPE or LLDPE. Preferably however, there are no other polymers present (other than possible additive carrier polymers, i.e. a form of masterbatch). The insulation layer is preferably free of polyurethane.

Hindered Amine Light Stabiliser

The insulation layer of the invention must comprise at least one HALS compound which possesses at least one 2,2,6,6-tetramethyl-piperidinyl group. The 2,2,6,6-tetramethyl-piperidinyl is the common motif characteristic of HALS compounds.

Preferably therefore, the HALS of interest in the invention will comprise one or more groups of formula:

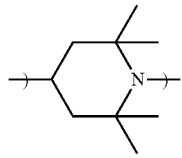

The N atom can be substituted or may simply carry an H. The nature of any substituent group present can vary. Typically, the 4-position of the of the piperidinyl ring is substituted. The nature of any substituent group present can vary.

Any HALS compound comprising the 2,2,6,6-tetramethyl-piperidinyl motif can be used and it will be appreciated that the art contains a wide variety of compounds possessing this motif, some of which are depicted below.

Certain HALS compounds are however preferred. It is generally preferred if the HALS comprises two or more 2,2,6,6-tetramethyl-piperidinyl groups. It is generally preferred if the HALS comprises at least four 2,2,6,6-tetramethyl-piperidinyl groups. It is generally preferred if the HALS comprises a 2,2,6,6-tetramethyl-piperidinyl group in which the nitrogen atom is free of substituent groups. It is generally preferred if the HALS is a polymer in which a plurality of 2,2,6,6-tetramethyl-piperidinyl groups are present.

It is preferred if the HALS comprises at least two piperidinyl groups of formula (I)

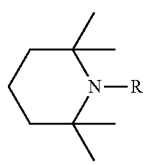

wherein R is H, $C_{1-15}$ alkyl, O, —$CH_2$—$R^2$ or —$OR^1$;
$R^1$ is H or $C_{1-15}$ alkyl; and
$R^2$ is a $C_{1-10}$ alkyl group which optionally comprises one or more heteroatoms selected from O, N or S or which optionally comprises a C=O group;
said at least two piperidinyl groups being covalently bound via the 4-position of the piperidinyl rings to a linking group.

In this regard, when R is O the formed compound is an N-oxide. It is preferred if R is H.

Alternatively, the hindered amine light stabiliser comprises one piperidinyl group of formula (II)

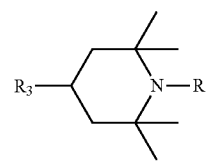

where R is as hereinbefore defined and $R_3$ is an organic group that may comprise at least one heteroatom, e.g. OCO—$C_{1-20}$ alkyl, $C_{1-20}$ alkyl. The HALS compounds of formula (II) therefore contain one 2,2,6,6-tetramethylpiperidinyl group.

Alternatively, the hindered amine light stabiliser comprises repeating units of formula (III)

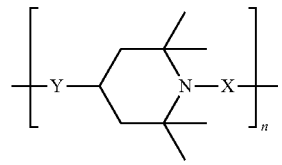

wherein n is at least 2;
X and Y represent atoms forming the repeating unit.

In a preferred embodiment, the HALS is a polymer and therefore contains at least two repeating units, such as a plurality of repeating units. A polymer can be formed via a structure (III) or via structure (I) in which the 2,2,6,6-tetramethylpiperidinyl group is linked via its 4-position to a linking group, where the linking group then forms a monomer unit.

The person skilled in the art can prepare a variety of compounds comprising the 2,2,6,6-tetramethylpiperidinyl motif.

In a preferred embodiment the HALS is:
bis 2,2,6,6-tetramethyl-4-piperidinyl-sebacate (such as Tinuvin 770 CAS 52829-07-9);
bis(1-octyloxy-2,2,6,6-tetramethyl-4-piperidyl) sebacate (such as Tinuvin 123 CAS 129757-67-1);
butanedioic acid, dimethylester, polymer with 4-hydroxy-2,2,6,6-tetramethyl-1-piperidine ethanol (such as Tinuvin 622 CAS 65447-77-0);
Bis-(1,2,2,6,6-pentamethyl-4-piperidyl) sebacate (such as Tinuvin 765 CAS 41556-26-7);
a mixture of esters of 2,2,6,6-tetramethyl-4-piperidinol and higher fatty acids (mainly stearic acid) (such as Cyasorb UV-3853 CAS 86403-32-9);
Tetrakis (2,2,6,6-tetramethyl-4-piperidyl)-1,2,3,4-butane tetracarboxylate (such as ADK Stab LA-57 CAS 64022-61-3);

Tetrakis (1,2,2,6,6-pentamethyl-4-piperidyl)-1,2,3,4-butane tetracarboxylate (such as ADK Stab LA-52 CAS 91788-83-9);

Di-(1,2,2,6,6-pentamethyl-4-piperidyl)-2-butyl-2-(3,5-di-tert-butyl-4-hydroxybenzyl)malonate (such as Tinuvin 144 CAS 63843-89-0)

2,9,11,13,15,22,24,26,27,28- decaazatricyclo[21.3.1.1^ (10,14)]octacosa-1(27),10,12,14(28),23,25-hexaene-12,25-diamine, N,N'-bis(1,1,3,3-tetramethylbutyl)-2,9,15,22-tetrakis (2,2,6,6-tetramethyl-4-piperidinyl)-(such as Chimassorb 966 CAS 86168-95-8);

Poly [(6-morpholino-s-triazine-2,4-diyl)[2,2,6,6-tetramethyl-4-piperidyl) imino]-hexamethylene [(2,2,6,6-tetramethyl-4-piperidyl) imino]] (such as Cyasorb UV 3346 CAS 82451-48-7)

1,6-Hexanediamine, N,N'-bis(2,2,6,6-tetramethyl-4-piperidinyl)-, Polymers with morpholine-2,4,6-trichloro-1,3,5-triazine (such as Cyasorb UV 3529 CAS 193098-40-7);

CAS-no. 247243-62-5 (such as Tinuvin NOR 371 CAS);

bis(2,2,6,6-tetramethyl-1-undecoxypiperidin-4-yl) carbonate (such as ADK StabLA-81 CAS705257-84-7);

N,N'-Bis(2,2,6,6-tetramethyl-4-piperidinyl)-1,6-hexanediamine polymer with 2,4,6-trichloro-1,3,5-triazine reaction products with N-butyl-l-butanamine and N-butyl-2,2,6,6-tetramethyl-4-piperidinamine (such as Chimassorb 2020 CAS 192268-64-7);

1,3,5-Triazine-2,4,6-triamine, N,N'''-(1,2-ethane-diylbis (((4,6-bis(butyl(1,2,2,6,6-pentamethyl-4-piperidinyl) amino)-1,3,5-triazine-2-yl) imino)-3,1-propanediyl))-bis-(N',N''-dibutyl-N',N''-bis-(1,2,2,6,6-pentamethyl-4-piperidinyl), (such as Sabostab UV 119 CAS 106990-43-6);

poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (such as Sabostab UV 94 CAS 71878-19-8);

1,2,3-tris-(1,2,2,6,6-pentamethyl-4-piperidinyl)-4-tridecyl butane-1,2,3,4-tetracarboxylate (such as ADK Stab LA-62 CAS 84696-72-0);

1,2,3-tris-(2,2,6,6-pentamethyl-4-piperidinyl)-4-tridecyl butane-1,2,3,4-tetracarboxylate (such as ADK Stab LA-67 CAS 84696-71-9);

2,2,4,4-tetramethyl-7-oxa-3,20-diaza-dispiro(5.1.11.2)-heneicosane-21-on (such as Hostavin N20 CAS 64338-16-5);

Bis(1,2,2,6,6-pentamethyl-4-piperidinyl)-2-(4-methoxybenzylidene)malonate (such as Hostavin PR-31 CAS 147783-69-5);

N,N'-bisformyl-N,N'-bis-(2,2,6,6-tetramethyl-4-piperidinyl)-hexamethylendiamine (such as Uvinul 4050 H 124172-53-8);

Polymer 2,2,4,4-tetramethyl-7-oxa-3,20-diaza-20- (2,3-epoxi-propyl)-dispiro-(5.1, 11.2)-heneicosane-21-one and Epichlorohydrin (such as Hostavin N30 CAS 202483-55-4);

1,3-Propanediamine, N,N''-1,2-ethanediylbis-polymer with 2,4,6-trichloro-1,3,5-triazine, reaction products with N-butyl-2,2,6,6-tetramethyl-4-piperidinamine (such as Uvasorb HA88 CAS 136504-96-6);

1,2,3,4-butanetetracarboxylic acid, polymer with beta, beta, beta', beta'-tetramethyl-2,4,8,10-tetraoxaspiro(5.5) undecane-3-9-diethanol, 1,2,2,6,6-pentamethyl-4-piperidinyl ester (such as ADK Stab LA-63P CAS 101357-36-2);

2,4,8,10-tetraoxaspiro(5.5) undecane-3,9-diethanol, beta, beta, beta', beta'-tetramethyl-polymer with 1,2,3,4-butanetetracarboxylic acid, 2,2,6,6-tetramethyl-4-piperidinyl ester (such as ADK Stab LA-68P CAS 101357-37-3);

Polymethylpropyl-3-oxy-4(2,2,6,6-tetramethyl) piperidinyl) siloxane (such as Uvasil 299 CAS 182635-99-0);

N-(2,2,6,6-tetramethyl-4-piperidyl)-maleinimid, $C_{20}$: $C_{24}$-olefin-copolymer (such as Uvinul 5050H CAS152261-33-1); and 4-(3-(3,5-di-t-butyl-4-hydroxyphenyl)propionyloxy-1-(2-(3-(3,5-di-t-butyl-4-hydroxy)propionyloxy) ethyl)-)-2,2,6,6-tetramethylpiperidine (such as sanol LS-2626 CAS 73754-27-5).

It is especially preferred if the HALS is 1,3,5-Triazine-2,4,6-triamine, N,N'''-(1,2-ethane-diylbis(((4,6-bis(butyl(1,2,2,6,6-pentamethyl-4-piperidinyl)amino)-1,3,5-triazine-2-yl) imino)-3,1-propanediyl))-bis-(N',N''-dibutyl-N',N''-bis-(1,2,2,6,6-pentamethyl-4-piperidinyl), or more preferably poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

Mixtures of HALS stabilisers can also be used.

Other Components

The insulation layer composition preferably comprises at least one halogen free flame retardant. The flame retardant is preferably hydrated inorganic filler such as hydrated calcium silicate, hydrated magnesium carbonate, hydrated magnesium hydroxide, hydrated aluminium hydroxide, calcium carbonate or calcium carbonate silicon gum combinations (see EP0393959, EP1863041, EP1512719, EP1862496, EP2199335 and EP1695997). Preferably, hydrated aluminium hydroxide or calcium carbonate silicon gum combinations are used. Hydrated aluminium hydroxide may also be referred to as aluminium trihydrate.

The amount of halogen free flame retardant present in the insulation composition may range from 30 to 69 wt % based on the weight of the insulation composition, preferably 45 to 55 wt %.

It is preferred if the insulation layer composition of the invention comprises at least one antioxidant, preferably at least one phenolic antioxidant. Preferred phenolic antioxidants are selected from [Octadecyl 3-(3',5'-di-tert. butyl-4-hydroxyphenyl)propionate] (e.g. Irganox 1076), benzenepropanoic acid, 3,5-bis(1,1-dimethylethyl)-4-hydroxy-, thiodi-2,1-ethanediyl ester (Irganox 1035), [Pentaerythrityl-tetrakis(3-(3',5'-di-tert, butyl-4-hydroxyphenyl)-propionate] (e.g. Irganox 1010); or 2',3-bis [[3-[3,5-di-tert-butyl-4-hydroxyphenyl]propionyl]] propionohydrazide (Irganox 1024 MD) or a combination thereof.

It is especially preferred if the insulation layer composition comprises [Pentaerythrityl-tetrakis(3-(3',5'-di-tert. butyl-4-hydroxyphenyl)-propionate] (e.g. Irganox 1010), or 2',3-bis [[3-[3,5-di-tert-butyl-4-hydroxyphenyl]propionyl]] propionohydrazide (Irganox 1024 MD) or, most especially a combination of these two antioxidants.

The insulation layer composition should preferably comprise 0.01 to 1.5 wt %, e.g. 0.1 to 1.2 wt % phenolic antioxidant. In a preferred embodiment, the insulation layer composition comprises 0.1 to 0.6 wt % Irganox 1010. In a preferred embodiment, the insulation layer composition comprises 0.15 to 0.65 wt % Irganox 1024 MD.

The insulation layer composition may also comprise at least one organic phosphite or phosphonite antioxidant such as [Bis(2-methyl-4,6-bis(1,1-dimethylethyl)phenyl)phosphorous acid ethylester] (e.g. Irgafos 38), [Tris(2,4-di-t-butylphenyl)phosphite] (e.g. Irgafos 168), or [Phosphorous acid-cyclic butylethyl propandiol, 2,4,6-tri-t-butylphenyl ester] (e.g. Ultranox 641).

It is preferred if the composition used in the insulation layer is cross-linked. It is thus preferred if a crosslinking agent is present in the insulation layer composition before the vulcanisation process. A crosslinking agent is a compound that crosslinks the polymer chain present.

Suitable crosslinking agents are multifunctional monomers which have two or more carbon-carbon double bonds. They include multifunctional vinyl monomers, acrylate and methacrylate monomers, and allyl monomers. Examples of multifunctional vinyl monomers include ethylene glycol divinyl ether, propylene glycol divinyl ether, triethylene glycol divinyl ether, divinyl urethanes, divinyl polyesters, the like, and mixtures thereof. Examples of multifunctional allyl monomers include diallyl phthalates, trimethylolpropane diallyl ether, triallyl cyanurate, allyl acrylate, allyl methacrylate, the like, and mixtures thereof. Examples of suitable multifunctional acrylates and methacrylates include trimethylolpropane triacrylate and trimethacrylate, glyceryl propoxy triacrylate and trimethacrylate, alkoxylated bisphenol A diacrylate and dimethacrylate, 1,4-butanediol diacrylate and dimethacrylate, the like, and mixtures thereof.

Multifunctional acrylates and methacrylates are preferred. Trifunctional acrylates and methacrylates are particularly preferred. A preferred crosslinking agent is trimethylpropane trimethacrylate.

The insulation layer composition should preferably comprise 0.1 to 2.0 wt %, e.g. 0.5 to 1.5 wt % crosslinking agent before crosslinking.

In order to allow crosslinking to occur, it is preferred of the insulation layer composition, before crosslinking, contains an initiator, such as a peroxide. Any known peroxide can be used. Preferred peroxides for curing polyolefins include dicumyl peroxide, tertiary diperoxides such as 2,5-dimethyl-2,5-di(t-butyl peroxy) hexane) hexyne-3, and diperoxy and polyperoxide compounds such as 1,3(4)-bis(tert-butylperoxyisopropyl)benzene.

The initiator content can vary in amount from about 0.2 to about 2.0 weight percent of the composition, and preferably from about 0.4 to about 1.0 weight percent.

The insulation layer composition of the invention may also contain pigments, lubricants, and processing aids provided that they do not interfere with cross-linking or detract from the physical properties of the composition. A processing aid can also be added to the mixture to facilitate dispersion of added inorganic components.

Preferred processing aids include alkoxysilane additives. Any conventional alkoxysilane known in the art can be used as long as it does not combust or degrade during polymer processing or interfere with crosslinking. Alkoxysilanes having 2 or 3 C1-3 alkoxy substituents, e.g., methoxy, ethoxy, propoxy, or combinations thereof, are particularly advantageous. Illustrative silanes include methyltriethoxysilane, methyltris(2-methoxyethoxy)silane, dimethyldiethoxylsilane, ethyltrimethoxysilane, vinyltris(2-methoxyethoxy)silane, phenyltris(2-methoxyethoxy)silane, vinyltrimethoxysilane, vinyltriethoxysilane, and gamma-methacryloxypropyl trimethoxysilane.

The use of vinyltrimethoxysilane or vinyltriethoxysilane is especially preferred.

The alkoxysilane component, if present, can vary in amount from about 0.2 to about 3.0 weight percent of the composition, and preferably from about 0.5 to about 2.0 weight percent.

In one embodiment, the insulation layer of the invention is free of a zinc salt of a mercaptobenzimidazole.

In a preferred embodiment, the insulation layer composition comprises:
i). 30 to 65 wt % of a polyethylene copolymer having a melting point of 105° C. or less, such as an ethylene vinyl acetate copolymer;

ii). 0.5 to 1.5 wt % of a hindered amine light stabiliser (HALS) comprising at least one 2,2,6,6-tetramethyl-piperidinyl group; and iii) 30 to 69 wt % of a halogen free flame retardant such as a hydrated inorganic filler.

In a preferred embodiment, the insulation layer composition comprises:
i). 30 to 65 wt % of a polyethylene copolymer having a melting point of 105° C. or less, such as an ethylene vinyl acetate copolymer;

ii). 0.5 to 1.5 wt % of a hindered amine light stabiliser (HALS) comprising at least one 2,2,6,6-tetramethyl-piperidinyl group;

iii) 30 to 69 wt % of a halogen free flame retardant such as a hydrated inorganic filler; and iv) 0.1 to 1.5 wt % of at least one phenolic antioxidant.

Composition of Matter

The invention further relates to a composition of matter suitable for use in the manufacture of an insulation layer in a cable.

That composition comprises
i). 30 to 65 wt % of a polyethylene copolymer having a melting point of 105° C. or less, such as an ethylene vinyl acetate copolymer;

ii). a hindered amine light stabiliser (HALS) comprising at least one 2,2,6,6-tetramethyl-piperidinyl group present in an amount of 0.5 to 1.5 wt %; and iii) 30 to 69 wt % of a halogen free flame retardant such as a hydrated inorganic filler.

The preferred options for the polyethylene copolymer, HALS, flame retardant, additional additives, weight percentages and so on discussed above in connection with the insulation layer of the wire or cable apply equally to this embodiment of the invention. It is thus most preferred if the HALS is Sabostab UV 94. It is most preferred if the composition additionally comprises at least one phenolic antioxidant, such as Irganox 1010 and/or Irganox 1024 MD.

It is preferred if the composition comprises at least one initiator such as a peroxide. It will be appreciated that in the final insulation layer on the cable, the material is cross-linked and hence the peroxide has decomposed to initiate reaction. The peroxide is however a component present in the composition before crosslinking.

The composition preferably comprises at least one cross-linking agent such as TMPTMA.

Wire or Cables

The polymer and additives can be mixed using any conventional procedure. Mixing technology is well known in the prior art. For instance, an internal mixer such as a Banbury mixer can be used. Other high shear internal mixers, including Farrel continuous mixer, Boiling Mixtrumat™, or Werner & Pfleiderer mixers, can also be used in the mixing procedure.

Typically, the polymer, HALS and flame retardant are first mixed together before the peroxide curing agent is added. The peroxide is then added under controlled temperature conditions. The temperature of peroxide mixing should be controlled in order to prevent premature cross-linking. Preferred peroxide mixing temperatures may be from about 50 to about 120° C.

The resulting blend is then applied to electrical conductors to form an insulating layer surrounding the conductor. The layer provides insulation and physical protection for the conductor and flame retardancy for the insulated conductor. The composition mixture is applied using any conventional coating techniques. Coating methods are well known in the art. A typical procedure is to apply the composition by extruding a substantially uniform layer onto a metal conductor. The extrusion may be carried out using a single screw extruder at the desired line speeds. Curing is typically accomplished by passing the insulated wire through a pressurized steam tube immediately following extrusion.

The wire or cable of the invention is preferably one that is designed for use in the automotive industry. Preferably, the cable comprises a conductive core (typically copper core) and an insulation layer. The insulation layer may be the only polymer layer present. The insulation layer may be of any preferred thickness, e.g. 0.2 to 1.3 mm, but is preferably less than 0.5 mm in thickness, such as 0.4 mm or less, especially 0.3 mm or less. The minimum insulation layer thickness may be 0.1 mm, preferably at least 0.2 mm. A thickness of 0.25 mm is especially preferred. The copper core may have a size of 0.1 to 25 mm$^2$. When used in relation to conductor, the term "size" means cross-section area.

The thickness of the insulation layer is the measurement below:

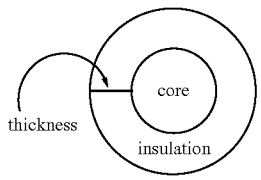

The wire or cables of the invention preferably pass the ISO 6722 test either at 125° C., or 150° C. or preferably both. There are three categories of cable which can be subjected to the ISO test 6722: thick wall, thin wall or ultra-thin wall. They are categorised based on the insulation thickness in relation to the conductor diameter and size. The thinner the wall, the more challenging it is to pass the ageing standard.

Data presented herein relates to thin wall requirements for a cable construction in which conductor size is 0,35 mm$^2$ and insulation thickness is 0.25 mm.

The invention further relates therefore to a wire or cable wherein the insulation layer composition passes a heat ageing measured according to ISO 6722 (thin wall cables as above) at 125° C. of at least 3000 hrs.

The invention further relates therefore to a wire or cable wherein the insulation layer composition passes a heat ageing measured according to ISO 6722 (thin wall cables as above) at 150° C. of at least 240 hrs.

The invention will now be described with reference to the following non limiting examples and figure. FIG. 1 compares heat ageing performance of examples of the invention, the comparative examples and an example from the U.S. Pat. No. 6,392,154 prior art.

Description of Measurement Methods

Melting point determinations were made by Differential Scanning calorimetry (DSC) in accordance with ISO11357-3. A TA-Instruments Q 2000 was used and operated between −60 to 180° C. at a ramping rate of 10° C./minute. The second melting cycle was used for determination of the melting point.

Melt Flow Rate (MFR$_2$)

The melt flow rates MFR$_2$ were measured under a load of 2.16 kg at 190° C. according to ISO 1133.

Density

Were measured using ISO1183.

Heat Aging Test

According to ISO 6722:2006. Data presented relates to a cable construction in which conductor size is 0.35 mm$^2$ and insulation thickness is 0.25 mm.

Oven used was an Elastocon EB01 cell oven with 15 air exchanges per hour. Samples of different materials were not aged in the same cell.

Samples were taken out of the oven after each day for samples aged at 175° C. For 165° C. the first sample outtake was done after 96 h, samples failing before this time are presented as <96 h in Table 2.

For 150° C. the first sample outtake was done after 10 days, samples failing before this time are presented as <240 hours in Table 2.

For 125° C. the first sample outtake was done after 2880 hours, samples failing before this time are presented as <2880 hours in Table 2.

Cross-Linking Behaviour

Soaking was done by adding the peroxide at 70° C. and heating the pellets to 60° C. before mixing. The material was allowed to mature during mixing for 16 h. In the materials with cure booster the liquid booster TPTMA was added together with the peroxide. The compounds were tested for crosslinking response using Monsanto rheometer. The torque was monitored over 15 min at 180° C. according to BTM 22591.

Materials

The following materials were used in order to prepare examples describing the invention:
EVA
 ELVAX 460A, produced by Du Pont. MFR$_{2,16}$=2.2 g/10 min, VA content=18 wt %, DSC melting point 87° C.
Aluminium Trihydrate (ATH)
 Precipitated ATH, Hydral PGA-SD, produced by Huber. Purity 99.5%. Particle size, d$_{50}$=1,1 μm (by Sedigraph 5100), Surface area 4.5 m$^2$/g.
Vinyl Triethoxysilane CAS No. 78-08-0
 Wacker Chemie, Geniosil GF 56. Purity >98%.
Antioxidants:
 Pentaerytrithyl-tetrakis(3-(3,5-di-tert. Butyl-4-hydroxyphenyl)-propionate, CAS no. 6683-19-8, Supplied by BASF, Irganox 1010, Purity>92%
 2,2-thiodiethylenebis-(3,5-di-tert. butyl-4-hydroxyphenyl)-propionate, CAS no. 41484-35-9. Supplied by BASF. Irganox 1035, Purity>98%
 N,N'-bis (3(3',5'-di-tert. butyl-4'-hydroxyphenyl)propionyl) hydrazide, CAS-no. 32687-78-8, supplied by BASF, Irganox MD 1024, purity>98%
 Di-octadecyl-disulphide, CAS-no. 2500-88-1, Hostanox SE10, supplied by Clariant, purity>98%
 Tris (2,4-di-t-butylphenyl) phosphite, (CAS no. 31570-04-4), supplied by BASF, Irgafos 168, purity>99%.

Di-stearyl-thio-di-propionate (DSTDP) (CAS-no. 693-36-7), supplied by BASF, Irganox PS 802, purity>93%

4,4'-bis(1,1'-dimethylbenzyl)diphenylamine (CAS-no. 10081-67-1), supplied by Addivant, Naugard 445, purity>99%

Light Stabilisers

Poly((6-((1,1,3,3-tetramethylbutyl)amino)-1,3,5-triazine-2,4-diyl)(2,2,6,6-tetramethyl-4-piperidyl)imino)-1,6-hexanediyl ((2,2,6,6-tetramethyl-4-piperidyl)imino)), CAS-no. 71878-19-8, supplied by Sabo, Sabostab 94, Chimassorb 944, ash content<0,1%, volatiles 105° C./2 hours <1%.

1,3,5-Triazine-2,4,6-triamine, N,N'''-(1,2-ethane-diylbis(((4,6-bis(butyl(1,2,2,6,6-pentamethyl-4-piperidinyl)amino)-1,3,5-triazine-2-yl) imino)-3,1-propanediyl))-bis-(N',N''-dibutyl-N',N''-bis-(1,2,2,6,6-pentamethyl-4-piperidinyl), CAS no. 106990-43-6, supplied by Sabo, Sabostab UV 119, Chimassorb 119, ash content<0,1%, volatiles 105° C./2 hours <1%.

Peroxide

Di(tert-butylperoxyisopropyl)benzene, CAS-no. 25155-25-3, Supplied by Arkema, Luperox F, Purity>96%

Curing Booster

Trimethylolpropane trimethacrylate, CAS No. 3290-92-4, Supplied by Evonik, Visiomer TMPTMA, Purity >98%

EXAMPLES

Compounds in accordance with the compositions described in Table 1 were produced in a 46 mm Buss line at 225 rpm and set temperatures of 120° C. in zone 1 and 110° C. in zone 2. The mixer screw was heated to 80° C. The extruder screw temperature was 110° C., the barrel heated to 120° C. and the speed 9 rpm. All ingredients were added to the first feeding port.

Cables were extruded at 125° C. melt temperature at a line speed of 100 m/min and in a sequential step cross-linked at 11 m/min in a vulcanisation tube with 10 bar nitrogen atmosphere at 400° C. in first zone and 375° C. in second zone.

The cables were then tested for heat ageing according to ISO 6722:2006 at 175, 165, 150 and 125 ° C.

The following compositions were prepared:

As may be seen in Table 1, the compositions according to the present invention are free from sulphur-containing antioxidants. It is worth noting that sulphur-containing antioxidant is a compound of obvious choice for a person skilled in the art when it comes to thermooxidative stabilisation of polyolefin compositions. It is well known in the art that sulphur-containing antioxidants are well suited for preventing oxidative ageing at elevated temperatures. However, sulphur-containing antioxidants have the disadvantage of generating acidic degradation products and providing unpleasantly smell.

The inventors have surprisingly found that excluding sulphur-containing antioxidants, such as DSTDP, Irganox 1035 and Hostanox SE10 used in the Comparative Examples and replacing it with HALS in relatively high amount provides improved heat ageing results, as presented in table 2.

TABLE 2

Heat ageing results on cables according to ISO 6722: 2006. Standard pass criteria is 240 h at 150° C. and 3000 h at 125° C.

| Temp ° C. | Comp. ex. 1 (h) | Comp. ex. 2 (h) | Comp. ex. 3 (h) | Inventive ex. 1 (h) | Inventive ex. 2 (h) | Inventive ex. 3 (h) |
|---|---|---|---|---|---|---|
| 125 | <2880 | <2880 | <2880 | >3170 | >3170 | 7000 |
| 150 | <240 | <240 | <240 | 800 | <240 | 800 |
| 165 | <96 | <96 | <96 | 292 | <96 | 96 |
| 175 | 24 | 48 | 24 | 96 | 24 | 96 |

Crosslinking behaviour of the compositions according to the present invention was studied and compared to the crosslinking behaviour of the compositions comprising conventional mixture of antioxidants. The results are summarized in Table 3, wherein the higher torque value indicates the higher degree of cross-linking.

TABLE 3

Impact of the additives on peroxide response

|  | Inventive example 4 | Inventive example 5 | Comparative example 4 | Comparative example 5 |
|---|---|---|---|---|
| EVA (wt %) | 43.48 | 43.45 | 43.01 | 42.52 |
| ATH (wt %) | 54.45 | 54.45 | 54.45 | 54.45 |
| Vinyl triethoxysilane (wt %) | 0.44 | 0.44 | 0.44 | 0.44 |

COMPOSITIONS TABLE 1

|  | Comp. ex. 1 (wt-%) | Comp. ex. 2 (wt-%) | Comp. ex. 3 Commercial material A | Inventive ex. 1 (wt-%) | Inventive ex. 2 (wt-%) | Inventive ex. 3 (wt %) |
|---|---|---|---|---|---|---|
| EVA | 41.97 | 41.28 | 42 | 42.18 | 42.3 | 43.45 |
| Al trihydrate | 54.45 | 54.45 | 54 | 54.45 | 54.45 | 54.45 |
| Vinyl triethoxysilane | 0.44 | 0.44 | 0.44 | 0.44 | 0.44 | 0.44 |
| Irganox 1010 | 0.2 | 0.25 | 0.8 | 0.3 | 0.3 | 0.4 |
| Irganox 1035 |  |  | 0.5 |  |  |  |
| Irganox 1024 MD | 0.4 | 0.8 | 0.5 | 0.45 | 0.45 | 0.51 |
| Sabostab UV 94 |  |  |  | 0.48 |  | 0.75 |
| Sabostab UV 119 |  |  |  |  | 0.36 |  |
| Irgafos 168 | 0.2 | 0.25 | — |  |  |  |
| DSTDP* | 0.64 | 0.88 |  |  |  |  |
| Hostanox SE10 |  |  | 0.8 |  |  |  |
| Luperox F | 0.7 | 0.7 | 1.1 | 0.7 | 0.7 | 0.7 |
| TMPTMA | 1 | 1 | — | 1 | 1 | 1 |

*Thioether antioxidant

TABLE 3-continued

Impact of the additives on peroxide response

| | Inventive example 4 | Inventive example 5 | Comparative example 4 | Comparative example 5 |
|---|---|---|---|---|
| Naugard 445 (wt %) | — | — | 0.49 | — |
| Irgafos 168 (wt %) | — | — | 0.34 | 0.49 |
| Irganox 1010 (wt %) | 0.33 | 0.4 | — | 0.43 |
| DSTDP (wt %) | — | — | 0.72 | 0.88 |
| Irganox 1024 | 0.48 | 0.51 | 0.55 | 0.79 |
| Chimassorb 119 | 0.82 | — | — | — |
| Chimassorb 944 | — | 0.75 | — | — |
| Torque value [dNm] after 15 min at 180° C. and varying peroxide content | | | | |
| 0.7 wt % Luperox F | 8.75 | 9.42 | 6.66 | 7.67 |
| 0.9 wt % Luperox F | 13.47 | 14.98 | 10.28 | 8.25 |
| 1.1 wt % Luperox F | 16.39 | 19.35 | 13.12 | 11.01 |

As may be seen in Table 3, eliminating sulphur- and phosphor-containing antioxidants and replacing these antioxidants with HALS significantly improves cross-linking efficiency.

CONCLUSIONS

From Table 1 and 2 it is clear that surprisingly the material Sandostab UV 94 and also the formulation based on the other light stabiliser, Sandostab UV 119, are the only compositions that passes after more than 3000 h at 125° C.; i.e. the formulations based on the inventive examples are working better the closer they are to the actual temperature of use. Further, it may be noted that the compositions according to the present invention comprise remarkably low amount of antioxidant compared to the compositions of the comparative examples, and still exhibit superior heat ageing properties. It is desirable to minimize the amount of antioxidant in order to improve cross-linking and electrical properties, to prevent exudation and to decrease productions costs as well as environmental impact.

The invention claimed is:

1. A wire or cable comprising a conductor coated with an insulation composition, wherein said insulation composition comprises:
   i) a polyethylene copolymer having a melting point of 105° C. or less; and
   ii) a hindered amine light stabiliser (HALS) comprising at least one 2,2,6,6-tetramethyl-piperidinyl group, wherein said HALS is present in an amount of 0.5 to 1.5 wt %; and
   iii) a halogen-free flame retardant, which is hydrated aluminum hydroxide,
   wherein the insulation composition is free from sulphur-containing antioxidants, and
   wherein the insulation composition forms a coating around the conductor, said coating having a thickness of 0.1 to 0.4 mm, and
   wherein the insulation composition is free of polyurethane.

2. A wire or cable as claimed in claim 1 wherein the polyethylene copolymer is an ethylene vinyl acetate copolymer or an ethylene (meth)acrylate copolymer, preferably an ethylene vinyl acetate copolymer.

3. A wire or cable as claimed in claim 1, wherein the hindered amine light stabiliser comprises:
   at least two piperidinyl groups of formula (I)

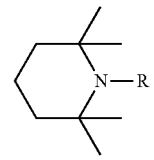

wherein R is H, $C_{1-15}$ alkyl, O, —$CH_2$—$R^2$ or —$OR^1$;
$R^1$ is H or $C_{1-15}$ alkyl; and
$R^2$ is a $C_{1-10}$ alkyl group optionally comprising one or more heteroatoms selected from O, N or S or a C=O group;
said at least two piperidinyl groups being covalently bound via the 4-position of the piperidinyl ring to a linking group;
wherein the hindered amine light stabiliser comprises one piperidinyl group of formula (II)

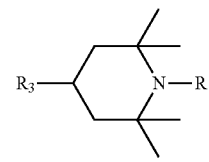

where R is as hereinbefore defined and $R_3$ is an organic group that may comprise at least one heteroatom;
or wherein the hindered amine light stabiliser comprises repeating units of formula (III)

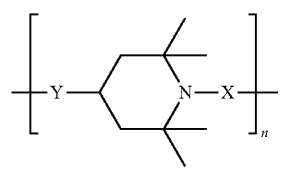

wherein n is at least 2;
X and Y represent atoms forming the repeating unit.

4. A wire or cable as claimed in claim 1, in which R is H.

5. A wire or cable as claimed in claim 1, in which the insulation composition is cross-linked.

6. A wire or cable as claimed claim 1, wherein the HALS is a polymer.

7. A wire or cable as claimed in claim 1, wherein the insulation composition has a heat ageing measured according to ISO 6722:2006 at 125° C. of at least 3000 hrs or a heat ageing measured according to ISO 6722:2006 at 150° C. of at least 240 hrs.

8. A wire or cable as claimed in claim 1, wherein the HALS is
bis 2,2,6,6-tetramethyl-4-piperidinyl-sebacate bis(1-octyloxy-2,2,6,6-tetramethyl-4-piperidyl) sebacate; butanedioic acid, dimethylester, polymer with 4-hydroxy-2,2,6,6-tetramethyl-1-piperidine ethanol;

Bis-(1,2,2,6,6-pentamethyl-4-piperidyl) sebacate;

a mixture of esters of 2,2,6,6-tetramethyl-4-piperidinol and higher fatty acids;

Tetrakis (2,2,6,6-tetramethyl-4-piperidyl)-1,2,3,4-butane tetracarboxylate;

Tetrakis (1,2,2,6,6-pentamethyl-4-piperidyl)-1,2,3,4-butane tetracarboxylate;

Di-(1,2,2,6,6-pentamethyl-4-piperidyl)-2-butyl-2-(3,5-di-tert-butyl-4-hydroxybenzyl)malonate 2,9,11,13,15,22, 24,26,27,28-decaazatricyclo[21.3.1.1^ (10,14)]octa-cosa-1(27), 10,12,14(28),23,25-hexaene-12,25-diamine, N,N'-bis(1,1,3,3-tetramethylbutyl)-2,9,15,22-tetrakis(2,2,6,6-tetramethyl-4-piperidinyl);

Poly [(6-morpholino-s-triazine-2,4-diyl)[2,2,6,6-tetramethyl-4-piperidyl) imino]-hexamethylene [(2,2,6,6-tetramethyl-4-piperidyl) imino]] 1,6-Hexanediamine, N,N'-bis(2,2,6,6-tetramethyl-4-piperidinyl)-, Polymers with morpholine-2,4,6-trichloro- 1,3,5-triazine;

bis(2,2,6,6-tetramethyl-1-undecoxypiperidin-4-yl) carbonate;

N,N'-Bis(2,2,6,6-tetramethyl-4-piperidinyl)-1,6-hexanediamine polymer with 2,4,6-trichloro-1,3,5-triazine reaction products with N-butyl-1-butanamine and N-butyl-2,2,6,6-tetramefhyl-4-piperidinamine;

1,3,5-Triazine-2,4,6-triamine, N,N' -(1,2-ethane-diylbis (((4,6-bis(butyl(1,2,2,6-pentamethyl-4-piperidinyl) amino)-1,3,5-triazine-2-yl) imino)-3,1-propanediyl))-bis-(N',N''-dibutyl-N',N''-bis-(1,2,2,6,6-pentamethyl-4-piperidinyl),; poly[[6-[(1,1,3.3-tetramethylbutyl (amino]-1,3,5-triazine-2,4-diyl][(2,2,6,6-tetramethyl-4-piperidinyl)imino]-1,6-hexanediyl[(2,2,6,6-tetramethyl-4-pipendinyl)imino]]);

1,2,3-tris-(1,2,2,6,6-pentamethyl-4-piperidinyl)-4-tridecyl butane-1,2,3,4-tetracarboxylate;

1,2,3-tris-(2,2,6,6-pentamethyl-4-piperidinyl)-4-tridecyl butane-1,2,3,4-tetracarboxylate;

2,2,4,4-tetramethyl-7-oxa-3,20-diaza-dispiro(5.1.11.2)-heneicosane-21-on;

Bis(1,2,2,6,6-pentamethyl-4-piperidinyl)-2-(4-methoxy-benzylidene)malonate;

N,N'-bisformyl-N,N'-bis-(2,2,6,6-tetramethyl-4-piperidinyl)-hexamethylendiamine;

Polymer 2,2,4,4-tetramethyl-7-oxa-3,20-diaza-20-(2,3-epoxi-propyl)-dispiro-(5.1, 11.2)-heneicosane-21-one and Epichlorohydrin;

1,3-Propanediamine, N,N''-1 ,2-ethanediylbis-polymer with 2,4,6-trichloro-1,3,5-triazine, reaction products with N-butyl-2,2,6,6-tetramethyl-4-piperidinamine;

1,2,3,4-butanetetracarboxylic acid, polymer with beta, beta, beta', beta'-tetramethyl-2,4,8,10-tetraoxaspiro (5.5) undecane-3-9-diethano1,1,2,2,6,6-pentamethyl-4-piperidinyl ester;

2,4,8,10-tetraoxaspiro(5.5) undecane-3,9-diethanol, beta, beta, beta', beta'-tetramethyl-polymer with 1,2,3,4-butanetetracarboxylic acid, 2,2,6,6-tetramethyl-4-piperidinyl ester;

Polymethylpropyl-3-oxy-4(2,2,6,6-tetramethyl) pipendinyl) siloxane;

N-(2,2,6,6-tetramethyl-4-piperidyl)-maleinimid, $C_{20}$: $C_{24}$-olefin-copolymer; or 4-(3-(3,5-di-t-butyl-4-hydroxyphenyl)propionyloxy-1-(2-(3-(3,5-di-i-butyl-4-hydroxy)propionyloxy) ethyl)-)-2, 2,6,6-tetramethylpiperidine; or a mixture thereof.

9. A wire or cable as claimed in claim 1, wherein the insulation composition comprises from 30 to 65 wt % ethylene- vinyl acetate copolymer based on the weight of the insulation composition; and/or 30 to 69 wt hydrated aluminum hydroxide based on the weight of the insulation composition.

10. A wire or cable as claimed in claim 1, wherein the insulation composition further comprises a sterically hindered phenolic antioxidant.

11. A wire or cable as claimed in claim 10, wherein said sterically hindered phenolic antioxidant is present in an amount of 0.01 to 1.5 wt %.

12. A wire or cable as claimed in claim 1, wherein the insulation composition comprises:
   i). an ethylene vinyl acetate copolymer; and
   ii). poly[[6-[(1,1,3.3-tetramethylbutyl)amino]-1,3,5-triazine-2,4-diyl]][(2,2,6,6-tetramethyl-4-piperidinyl) imino]-1,6-hexanediyl[(2,2,6,6-tetramethyl-4-piperidinyl)imino]]); and
   iii). pentaerythritol Tetrakis(3-(3,5-di-tert-butyl-4-hydroxyphenyl)propionate or 2',3-bis [[3-[3,5-di-tert-butyl-4-hydroxyphenyl]propionyl]] propionohydrazide or a combination thereof.

13. A wire or cable as claimed in claim 1, wherein the insulation composition forms a coating around the conductor, said coating having a thickness of 0.1 to 0.3 mm.

14. A process for the preparation of a wire or cable as claimed in claim 1, comprising extruding an insulation composition as defined in claim 1 onto a conductor to form a crosslinkable wire or cable comprising a conductor coated with said insulation composition; and crosslinking the crosslinkable wire or cable.

\* \* \* \* \*